(12) United States Patent
Park et al.

(10) Patent No.: US 12,462,481 B2
(45) Date of Patent: Nov. 4, 2025

(54) REAL-TIME 3D HUMAN OBJECT RECONSTRUCTION APPARATUS AND METHOD BASED ON MONOCULAR COLOR IMAGE

(71) Applicant: Korea Electronics Technology Institute, Seongnam-si (KR)

(72) Inventors: Min Gyu Park, Seoul (KR); Ju Hong Yoon, Hwaseong-si (KR); Ju Mi Kang, Seongnam-si (KR); Je Woo Kim, Seongnam-si (KR); Yong Hoon Kwon, Seoul (KR)

(73) Assignee: Korea Electronics Technology Institute, Seongnam-si (KR)

( * ) Notice: Subject to any disclaimer, the term of this patent is extended or adjusted under 35 U.S.C. 154(b) by 0 days.

(21) Appl. No.: 18/573,736

(22) PCT Filed: Dec. 13, 2022

(86) PCT No.: PCT/KR2022/020187
§ 371 (c)(1),
(2) Date: Dec. 22, 2023

(87) PCT Pub. No.: WO2024/117356
PCT Pub. Date: Jun. 6, 2024

(65) Prior Publication Data
US 2025/0104344 A1 Mar. 27, 2025

(30) Foreign Application Priority Data
Nov. 29, 2022 (KR) ........................ 10-2022-0162779

(51) Int. Cl.
*G06T 17/00* (2006.01)
*G06V 10/44* (2022.01)
*G06V 10/56* (2022.01)

(52) U.S. Cl.
CPC .............. *G06T 17/00* (2013.01); *G06V 10/44* (2022.01); *G06V 10/56* (2022.01)

(58) Field of Classification Search
CPC ........... G06T 17/00; G06T 7/593; G06T 5/75; G06T 7/70; G06V 10/44; G06V 10/56;
(Continued)

(56) References Cited

U.S. PATENT DOCUMENTS 12,165,241 B1* 12/2024 Meng ..................... G06T 11/006
2008/0309676 A1* 12/2008 Nehab ....................... G06T 9/00
345/611

(Continued)

FOREIGN PATENT DOCUMENTS

CN 113506335 A 10/2021
JP 2014-123208 A 7/2014
(Continued)

OTHER PUBLICATIONS

International Search Report No. PCT/KR2022/020187 Issued on Aug. 28, 2023 (3 Pages in Korean).

*Primary Examiner* — Jitesh Patel
(74) *Attorney, Agent, or Firm* — NSIP Law

(57) ABSTRACT

There are provided an apparatus and a method for reconstructing a 3D human object in real time based on a monocular color image. A 3D human object reconstruction apparatus according to an embodiment extracts a pixel-aligned feature from a monocular image, extracts a ray-invariant feature from the pixel-aligned feature, generates encoded position information by encoding position information of a point, predicts a SD of a point from the ray-invariant feature and the encoded position information which are extracted, and reconstructs a 3D human object by using the predicted SD. Accordingly, the ray-invariant feature extracted from the pixel-aligned feature, and the encoded position information are used, so that an amount of (Continued)

2D plane 3D space computation for predicting SDs of points of a 3D space can be noticeably reduced and a speed can be remarkably enhanced.

11 Claims, 6 Drawing Sheets

(58) Field of Classification Search
CPC .......... G06N 3/04; G06N 3/08; G06N 3/045; G06N 3/0455; G06N 20/00; H04N 13/15
See application file for complete search history.

(56) References Cited

U.S. PATENT DOCUMENTS

| | | | | |
|---|---|---|---|---|
| 2010/0316270 | A1* | 12/2010 | Erhard ................ | G06T 11/006 382/128 |
| 2012/0194516 | A1* | 8/2012 | Newcombe ............ | G06T 17/00 345/420 |
| 2021/0279386 | A1* | 9/2021 | Guo ....................... | G06F 30/27 |

FOREIGN PATENT DOCUMENTS

| | | |
|---|---|---|
| KR | 10-2015-0082379 A | 7/2015 |
| KR | 10-2063562 B1 | 1/2020 |
| KR | 10-2022-0083547 A | 6/2022 |

* cited by examiner

REAL-TIME 3D HUMAN OBJECT RECONSTRUCTION APPARATUS AND METHOD BASED ON MONOCULAR COLOR IMAGE

CROSS REFERENCE TO RELATED APPLICATIONS

This application is a U.S. National Stage Application of International Application No. PCT/KR2022/020187, filed on Dec. 13, 2022, which claims the benefit under 35 USC 119(a) and 365(b) of Korean Patent Application No. 10-2022-0162779, filed on Nov. 29, 2022, in the Korean Intellectual Property Office, the entire disclosure of which is incorporated herein by reference for all purposes.

TECHNICAL FIELD

The disclosure relates to a deep learning-based three-dimensional (3D) reconstruction technology, and more particularly, to a method and an apparatus for reconstructing a 3D human object (human body shape) from a monocular color image in real time based on deep learning.

BACKGROUND ART

As a method for reconstructing a 3D human object by using a monocular color image, there are 1) a method of predicting a depth image, 2) a method of predicting a whole 3D space including an object, and 3) a method of training a deep learning-based implicit function and predicting.

However, the method of predicting a depth image may have a problem that it is impossible to reconstruct a self-occlusion area, for example, a body part occluded by arms, and may have a demerit that much data is required for learning although it has an advantage of high-performance speed.

In addition, the method of predicting a whole 3D space requires high memory usage and a large amount of computation, and thus has a problem of slow execution speed.

The method of training a deep learning-based implicit function and predicting has advantages of high learning efficiency and high accuracy, but has a problem that much time is required to perform computation.

DISCLOSURE

Technical Problem

The disclosure has been developed in order to address the above-discussed deficiencies of the prior art, and an object of the disclosure is to provide an apparatus and a method for reconstructing a 3D human object from a monocular color image in real time by using a deep learning-based implicit function, which can reduce an amount of computation.

Technical Solution

According to an embodiment of the disclosure to achieve the above-described object, a 3D human object reconstruction apparatus may include: a feature extraction unit configured to extract a pixel-aligned feature from a monocular image; a pointer configured to indicate points on a 3D space one by one in sequence; a feature encoder configured to extract a ray-invariant feature from the pixel-aligned feature; a position encoder configured to generate encoded position information by encoding position information of a point indicated by the pointer; a decoder configured to predict a signed distance (SD) of a point from the ray-invariant feature and the encoded position information which are extracted; and a reconstruction unit configured to reconstruct a 3D human object by using the predicted SD.

The ray-invariant feature may be used for predicting SDs of points existing on a same ray in common.

The pixel-aligned feature and the ray-invariant feature may be extracted on a pixel basis, and the encoded position information may be generated on a point basis.

The monocular image MAY BE a monocular color image, the decoder may predict the SD and color information of the point from the ray-invariant feature and the encoded position information which are extracted, and the reconstruction unit may generate a 3D color human object by applying color information to the reconstructed 3D human object.

The feature extraction unit, the feature encoder, the position encoder and the decoder may be implemented by deep learning networks, and a loss function for training the feature extraction unit, the feature encoder, the position encoder, and the decoder may include a SD loss function and a SD density function.

The SD density function may be a loss function for enhancing accuracy of color information prediction.

According to the disclosure, the 3D human object reconstruction apparatus may further include an estimation unit configured to estimate a SD of a point, and the decoder may predict the SD of the point from information which merges the extracted ray-invariant feature, encoded position information with the SD which is estimated by the estimation unit.

The estimation unit may estimate SDs of points from the monocular image by using a skinned multi-person linear model (SMPL).

According to the disclosure, the 3D human object reconstruction apparatus may further include an extraction unit configured to generate a mask by extracting a human object part from the monocular image, and to output masking information of a point indicated by the pointer, and the feature encoder may extract the ray-invariant feature from information which merges the pixel-aligned feature and the masking information.

According to another aspect of the disclosure, there is provided a 3D human object reconstruction method including: a step of extracting a pixel-aligned feature from a monocular image; a step of indicating points on a 3D space one by one in sequence; a step of extracting a ray-invariant feature from the pixel-aligned feature; a step of generating encoded position information by encoding position information of a point indicated by the pointer; a step of predicting a signed distance (SD) of a point from the ray-invariant feature and the encoded position information which are extracted; and a step of reconstructing a 3D human object by using the predicted SD.

According to still another aspect of the disclosure, there is provided a SD prediction apparatus of a 3D human object, the SD prediction apparatus including: a feature encoder configured to extract a ray-invariant feature from a pixel-aligned feature extracted from a monocular image; a position encoder configured to generate encoded position information by encoding position information of a point; and a decoder configured to predict a signed distance (SD) of a point from the ray-invariant feature and the encoded position information which are extracted.

According to yet another aspect of the disclosure, there is provided a SD prediction method of a 3D human object, the SD prediction method including: a step of extracting a ray-invariant feature from a pixel-aligned feature extracted from a monocular image; a step of generating encoded position information by encoding position information of a point; and a step of predicting a signed distance (SD) of a point from the ray-invariant feature and the encoded position information which are extracted.

Advantageous Effects

According to embodiments of the disclosure as described above, the apparatus and method use a ray-invariant feature extracted from a pixel-aligned feature, and encoded position information, so that an amount of computation for predicting SDs of points of a 3D space can be noticeably reduced and a speed can be remarkably enhanced.

According to embodiments of the disclosure, color information may be predicted along with SDs of points from pixel-aligned features, and a loss function for color information may be replaced with a loss function regarding a density function of a SD, so that accuracy of color information prediction can be enhanced without a GT on color information.

BEST MODE

Hereinafter, the disclosure will be described in more detail with reference to the drawings.

Embodiments of the disclosure provide a technology for reconstructing a 3D huma object (human body shape) from a monocular color (RGB) image in real time by using a signed distance function (SDF) such as a deep learning-based implicit function (deep implicit function).

The SDF is a function that predicts a signed distance (SD) (encoded distance information) of an object surface in a 3D space as 0. Accordingly, since an object is reconstructed by summing all points on the 3D space where the SD is 0, the SDF may be used for reconstructing a 3D human object.

Unlike a related-art deep learning-based implicit function which predicts SDs regarding points by using a pixel-aligned feature as it is, a deep implicit function in an embodiment of the disclosure may extract a ray-invariant feature by encoding a pixel-aligned feature once more, and may reuse the ray-invariant feature in predicting SDs of all points on the same ray, so that an amount of computation can be reduced and a speed can be enhanced.

Figure 1:
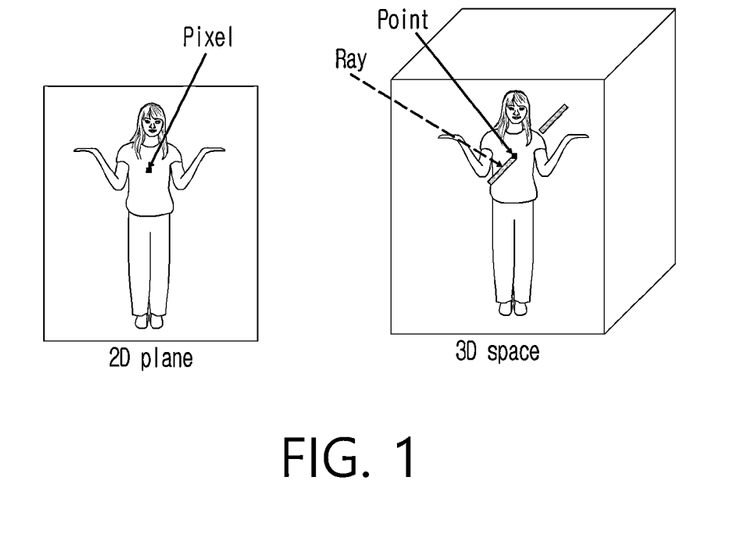
FIG. 1 is a view provided to explain concepts of a pixel, a point, and a ray.

Concepts of a pixel, a point, a ray which are used in embodiments of the disclosure are illustrated in FIG. 1, and are defined as follows:

Pixel: One point (x, y) on a 2D color image
Point: One point (x, y, z) on a 3D space
Ray: A set of points (x, y, z) having the same (x, y); for example, point (x, y, 1), point (x, y, 2), point (x, y, 3), . . . , point (x, y, Z) are points existing on the same ray. A ray direction in the 3D space is the same as a depth direction.

In an embodiment of the disclosure, encoded position information regarding a point may be generated to add a position-specific feature to the ray-invariant feature, and may be used for predicting SDs of points along with the ray-invariant feature. In addition, in embodiments of the disclosure, not only SDs of points but also color information may be predicted.

Figure 2:
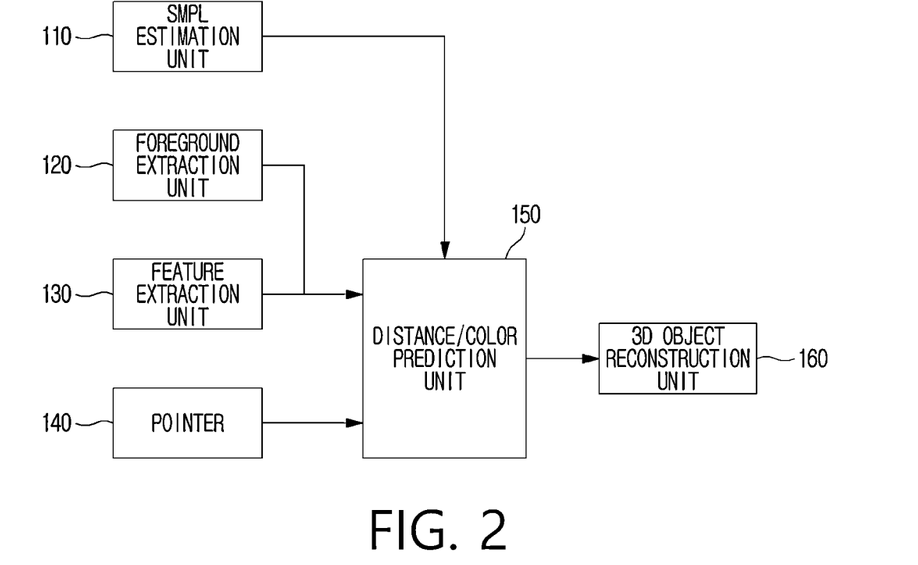
FIG. 2 is a view illustrating a structure of a monocular color image-based real-time 3D human object reconstruction apparatus according to an embodiment of the disclosure.

FIG. 2 is a view illustrating a structure of a monocular color image-based real-time 3D human object reconstruction apparatus according to an embodiment of the disclosure.

As shown in FIG. 2, the 3D human object reconstruction apparatus according to an embodiment of the disclosure may include a skinned multi-person linear model (SMPL) estimation unit 110, a foreground extraction unit 120, a feature extraction unit 130, a pointer 140, a distance/color prediction unit 150, and a 3D object reconstruction unit 160.

The SMPL estimation unit 110 calculates SDs of points from a monocular color image by using a SMPL. The foreground extraction unit 120 may generate a mask by extracting a foreground (that is, a human object) part from the monocular color image.

The feature extraction unit 130 may extract pixel-aligned features from the monocular color image. The pixel-aligned features are features that are aligned with pixels, and are a vector that lists features of points on a 3D space which are at the same coordinates (x, y) as pixels, specifically, points existing on a ray passing pixels.

The pointer 140 indicates points on the 3D space one by one in sequence. Points are indicated by the pointer 140 based on a ray order. Points on the ray of the first pixel are indicated in sequence, points on the ray of the second pixel are indicated in sequence, and in the same way, points on the ray of the last pixel are indicated in sequence.

The SMPL estimation unit 110 outputs a SD of a point indicated by the pointer 140, and the foreground extraction unit 120 outputs masking information of a point indicated by the pointer 140. As described above, the SMPL estimation unit 110 and the foreground extraction unit 120 may output data on a point basis.

However, the feature extraction unit 130 may extract and output a pixel-aligned feature on a pixel basis. That is, only when a point indicated by the pointer 140 is (x, y, 0), a pixel-aligned feature regarding a ray where the corresponding point is positioned may be extracted.

The distance/color prediction unit 150 predicts a SD and color information of each point by using a SD of a point provided by the SMPL estimation unit 110, masking information of a point provided by the foreground extraction unit 120, a pixel-aligned feature provided by the feature extraction unit 130, and a point indicated by the pointer 140.

In this process, the distance/color prediction unit 150 may 1) extract a ray-invariant feature from the masking information and the pixel-aligned feature, 2) encode position information of a point, and 3) predict a SD and color information for each point by merging the ray-invariant feature and the encoded position information of the point and the SD which is outputted by the SMPL estimation unit 110.

The 3D human body reconstruction unit 160 reconstructs a 3D color human object by using the SD and the color information predicted by the distance/color prediction unit 150.

Figure 3:
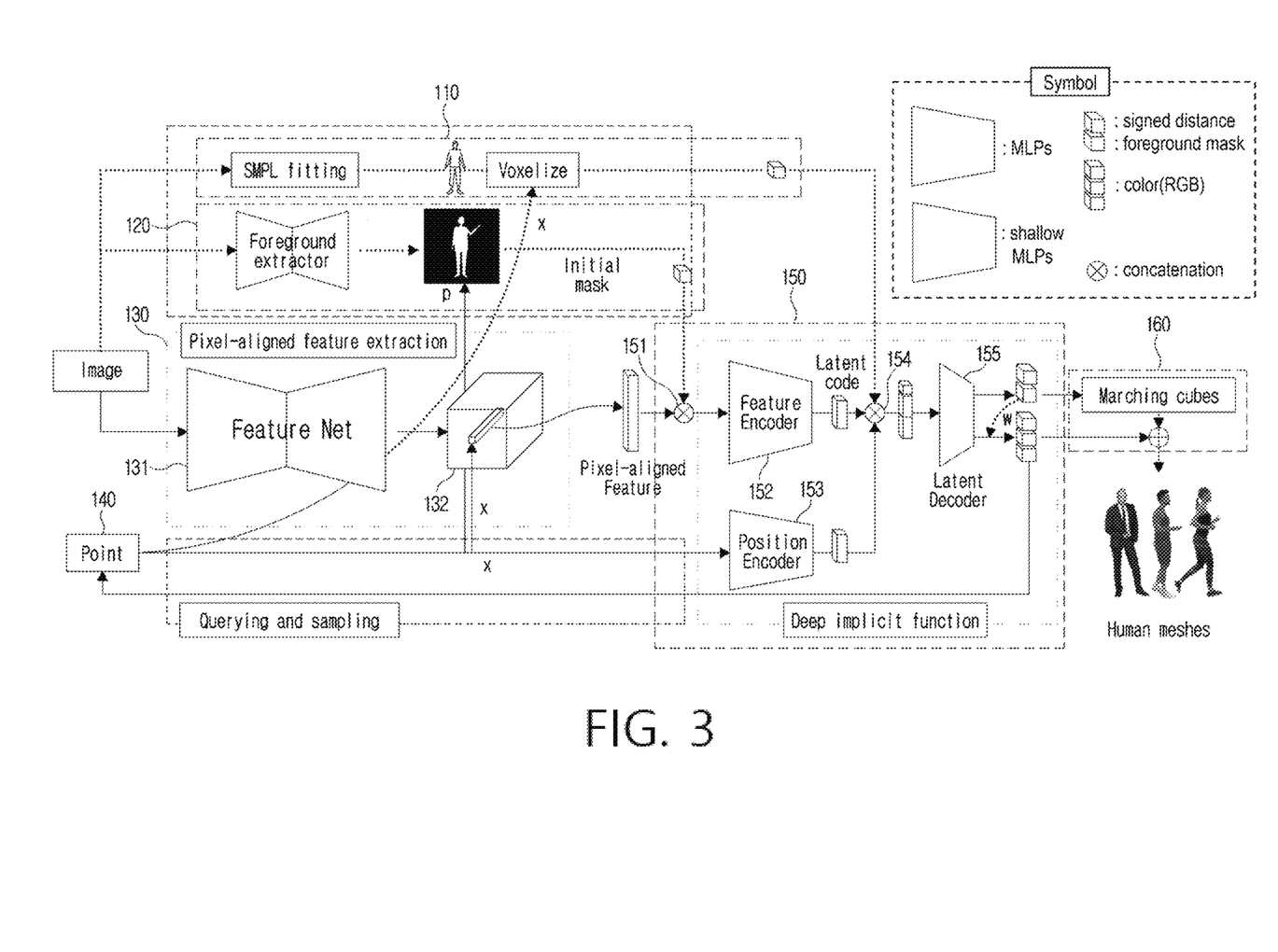
FIG. 3 is a view illustrating a detailed structure of the real-time 3D human object reconstruction apparatus shown in FIG. 2.

FIG. 3 is a view illustrating a detailed structure of the real-time 3D human object reconstruction apparatus shown in FIG. 2.

The SMPL estimation unit 110 voxelizes a 3D human object by fitting a SMPL from a monocular color image, and outputs a SD of a point indicated by the pointer 140. The SD may be calculated by using a normal SDF.

The foreground extraction unit 120 may extract a foreground (that is, a human object) part from the monocular color image, and may generate a mask for masking a background part except for the extracted foreground part. The foreground extraction unit 120 outputs masking information of a pixel (x, y) corresponding to a point (x, y, z) indicated by the pointer 140.

The feature extraction unit 130 may include a feature extraction network 131 and a feature selector 132. The feature extraction network 131 is a deep learning network that is trained to extract pixel-aligned features from a monocular color image.

The feature selector 132 selects and extracts a pixel-aligned feature from the pixel-aligned features extracted by the feature extraction network 131 on a pixel basis. A pixel-aligned feature extracted by the feature selector 132 is a pixel-aligned feature of a pixel (x, y) corresponding to a point (x, y, z) indicated by the pointer 140. However, only when a point indicated by the pointer 140 is (x, y, 0), the feature selector 132 extracts a pixel-aligned feature.

The distance/color prediction unit 150 predicts a SD and color information regarding each point of a 3D space by using the pixel-aligned feature extracted by the feature extraction unit 130. The distance/color prediction unit 150 performing the above-described function may include a merging unit 151, a feature encoder 152, a position encoder 153, a merging unit 154, and a decoder 155.

The merging unit 151 may concatenate the pixel-aligned feature extracted by the feature selector 132 and the masking information outputted from the foreground extraction unit 120.

The feature encoder 152 is a deep learning network that is trained to extract a ray-invariant feature from a pixel-aligned feature which is concatenated with masking information. "Latent code" in FIG. 3 is a ray-invariant feature. The ray-invariant feature is used for points existing on the same ray in common. That is, the ray-invariant feature has a characteristic of being reused for points existing on the same ray.

The position encoder 153 is a deep learning network that is trained to encode position information of a point indicated by the pointer 140 and to generate encoded position information.

The merging unit 154 concatenates the SD which is outputted from the SMPL estimation unit 110, the ray-invariant feature which is outputted from the feature encoder 152, and the encoded position information which is outputted from the position encoder 153.

The decoder 155 is a deep learning network that is trained to predict a SD and color information of a point from information concatenated by the merging unit 154 on a point basis.

Computation by the position encoder 153 is performed on a point basis, and accordingly, encoded position information is generated at every point. On the other hand, computation by the feature encoder 152 is performed on a pixel basis (that is, a ray basis) rather than on a point basis.

Compared to a related-art method in which feature encoding computation for training an implicit function is performed on a point basis, the method according to an embodiment of the disclosure performs corresponding computation on a pixel basis, so that an amount of computation of the feature encoder 152, which requires the largest amount of computation, can be noticeably reduced, and eventually, a speed of the 3D human object reconstruction apparatus can be remarkably enhanced, and accordingly, a 3D human object can be reconstructed in real time.

The 3D human body reconstruction unit 160 reconstructs a 3D human object from the SD of the point predicted by the distance/color prediction unit 150 by using a 3D model reconstruction technique such as a marching cube algorithm, and reconstructs a 3D color human object by applying the point color predicted by the distance/color prediction unit 150 to the reconstructed 3D human object.

The foreground extraction unit 120, the feature extraction network 131, the feature encoder 152, the position encoder 153, and the decoder 155 which are deep learning networks proposed in FIG. 2 may be trained in an end-to-end method.

A loss function for training may include a SD loss function (a function which calculates a difference between a predicted SD and a ground truth (GT) SD), and a color loss function (a function which calculates a difference between a predicted color and a GT color).

The color loss function may be replaced with a density function which transforms predicted SDs into a density function. This may be used as a method for enhancing accuracy of color prediction when it is difficult to guarantee a GT color.

Figure 4:
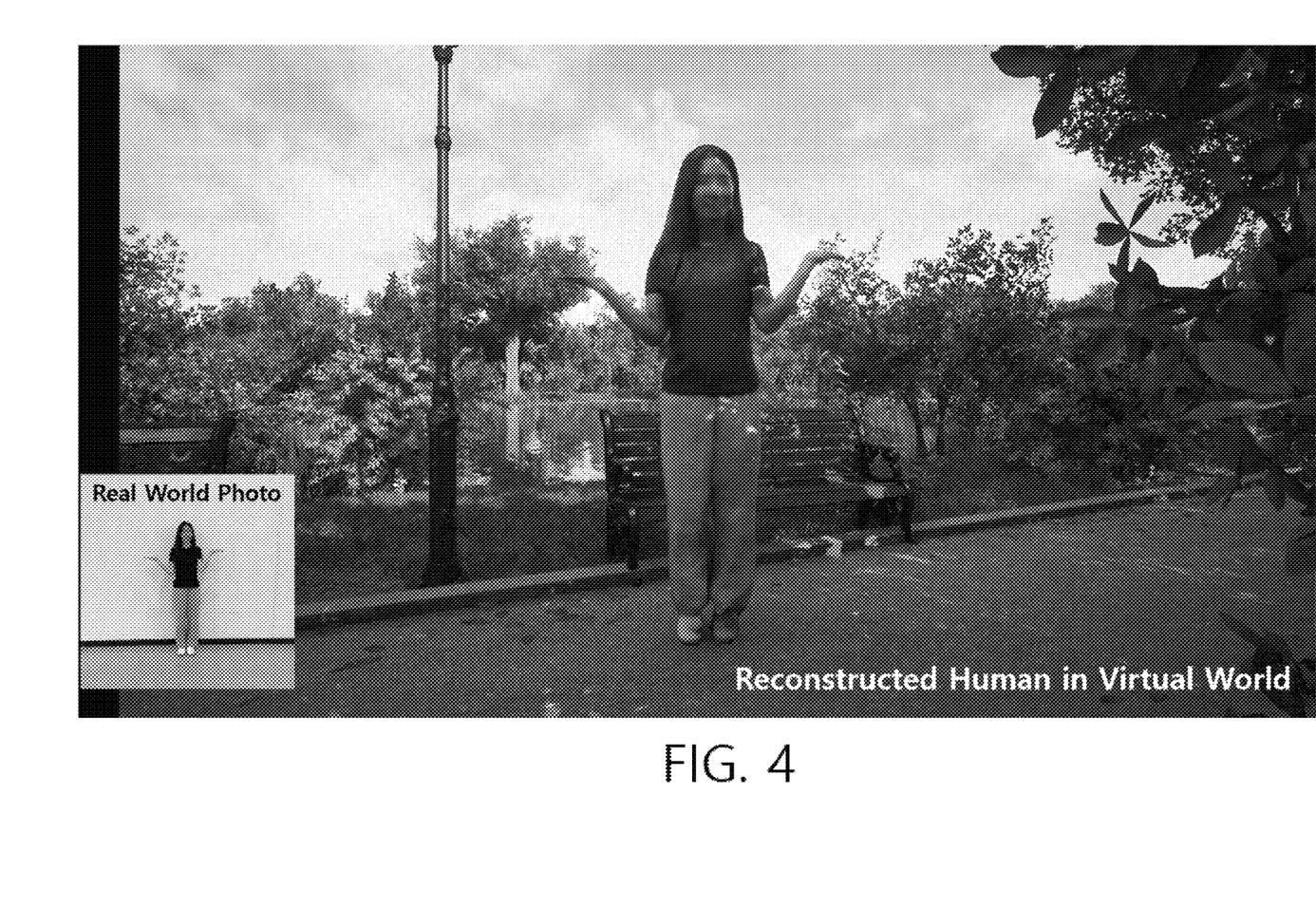
FIG. 4 is a view illustrating a result of reconstructing a 3D human object by using the real-time 3D human object reconstruction apparatus according to an embodiment of the disclosure.

FIG. 4 illustrates a result of mering a 3D human object which is reconstructed from a monocular color image (a lower portion of the left side) in real time with a virtual 3D space, by using the real-time 3D human body shape reconstruction apparatus according to an embodiment of the disclosure.

Figure 5:
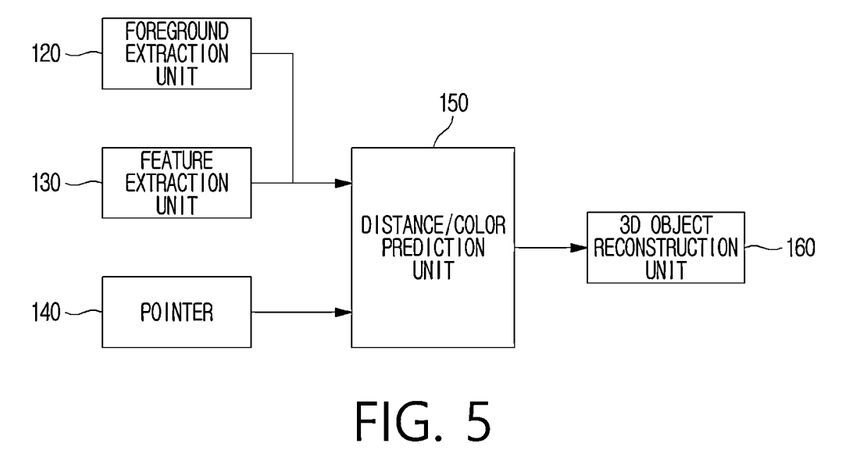
FIG. 5 is a view illustrating a structure of a monocular color image-based real-time 3D human object reconstruction apparatus according to another embodiment of the disclosure.

FIG. 5 is a view illustrating a structure of a monocular color image-based real-time 3D human object reconstruction apparatus according to another embodiment of the disclosure. This apparatus is the real-time 3D human object reconstruction apparatus of FIG. 3 from which the SMPL estimation unit 110 is excluded.

Accordingly, in predicting a SD and color information of each point, the distance/color prediction unit 150 uses only masking information of a point provided by the foreground extraction unit 120, a pixel-aligned feature provided by the feature extraction unit 130, and a point indicated by the pointer 140.

Specifically, the merging unit 154 of the distance/color prediction unit 150 concatenates a ray-invariant feature outputted from the feature encoder 152 and encoded position information outputted from the position encoder 153 without a SD outputted from the SMPL estimation unit 110, and the decoder 155 predicts a SD and color information of a point on a point basis from information that is not concatenated with a SD, which is outputted from the SMPL estimation unit 110.

Figure 6:
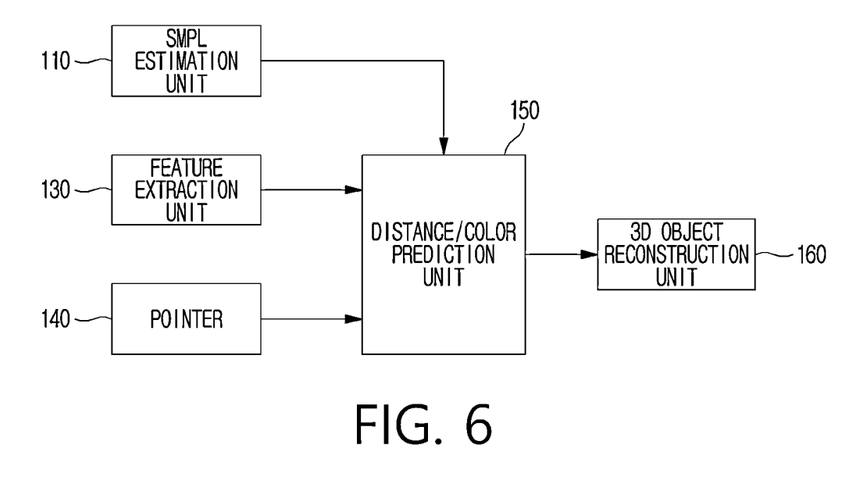
FIG. 6 is a view illustrating a structure of a monocular color image-based real-time 3D human object reconstruction apparatus according to still another embodiment of the disclosure.

FIG. 6 is a view illustrating a structure of a monocular color image-based real-time 3D human object reconstruction apparatus according to still another embodiment of the disclosure. This apparatus is the real-time 3D human object reconstruction apparatus of FIG. 3 from which the foreground extraction unit 120 is excluded.

Accordingly, in predicting a SD and color information of each point, the distance/color prediction unit 150 uses only a SD of a point provided by the SMPL estimation unit 110, a pixel-aligned feature provided by the feature extraction unit 130, and a point indicated by the pointer 140.

Specifically, the feature encoder 152 of the distance/color prediction unit 150 extracts a ray-invariant feature only with the pixel-aligned feature without masking information provided by the foreground extraction unit 120.

Figure 7:
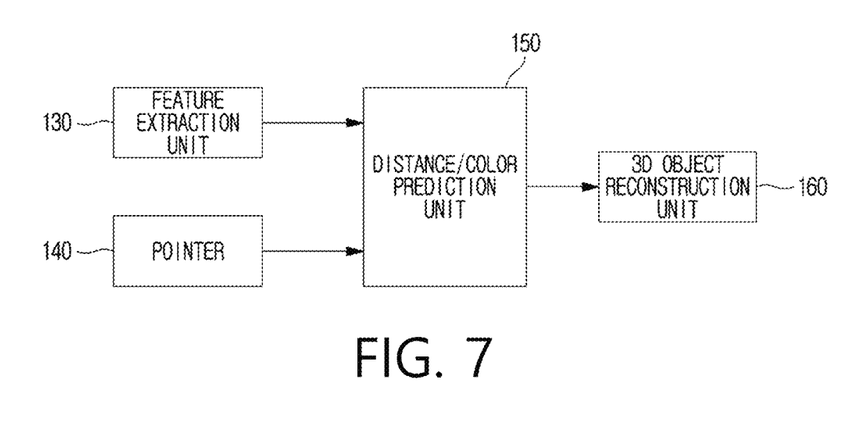
FIG. 7 is a view illustrating a structure of a monocular color image-based real-time 3D human object reconstruction apparatus according to yet another embodiment of the disclosure.

FIG. 7 is a view illustrating a structure of a monocular color image-based real-time 3D human object reconstruction apparatus according to yet another embodiment of the disclosure. This apparatus is the real-time 3D human object reconstruction apparatus of FIG. 3 from which the SMPL estimation unit 110 and the foreground extraction unit 120 are excluded.

Accordingly, in predicting a SD and color information of each SD, the distance/color prediction unit 150 uses only a pixel-aligned feature provided by the feature extraction unit 130 and a point indicated by the pointer 140.

Specifically, the feature encoder 152 of the distance/color prediction unit 150 extracts a ray-invariant feature only with the pixel-aligned feature without masking information provided by the foreground extraction unit 120.

In addition, the merging unit 154 of the distance/color prediction unit 150 concatenates only the ray-invariant feature outputted from the feature encoder 152 and encoded position information outputted from the position encoder 153 without a SD outputted from the SMPL estimation unit 110, and the decoder 155 predicts a SD and color information of a point on a point basis from information that is not concatenated with a SD outputted from the SMPL estimation unit 110.

Up to now, the monocular color image-based real-time 3D human object reconstruction apparatus and method has been described with reference to preferred embodiments.

Unlike a related-art deep learning-based implicit function which predicts SDs of points by using a pixel-aligned feature as it is, the apparatus and method in embodiments of the disclosure extracts a ray-invariant feature by encoding a pixel-aligned feature once more, and reuses the ray-invariant feature in predicting SDs of all points on the same ray, so that an amount of computation can be reduced and a speed can be enhanced.

In embodiments of the disclosure, encoded position information regarding a point may be generated to add a position-specific feature to a ray-invariant feature, and may be used for predicting SDs of points along with the ray-invariant feature, and not only SDs of points but also color information are also predicted.

The technical concept of the disclosure may be applied to a computer-readable recording medium which records a computer program for performing the functions of the apparatus and the method according to the present embodiments. In addition, the technical idea according to various embodiments of the disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the disclosure have been illustrated and described, the disclosure is not limited to the above-described specific embodiments. Various changes can be made by a person skilled in the art without departing from the scope of the disclosure claimed in claims, and also, changed embodiments should not be understood as being separate from the technical idea or prospect of the disclosure.

The invention claimed is:

1. A 3D human object reconstruction apparatus comprising:
    a feature extraction unit configured to extract a pixel-aligned feature from a monocular image;
    a pointer configured to indicate points on a 3D space one by one in sequence;
    a feature encoder configured to extract a ray-invariant feature from the pixel-aligned feature;
    a position encoder configured to generate encoded position information by encoding position information of a point indicated by the pointer;
    a decoder configured to predict a signed distance (SD) of a point from the ray-invariant feature and the encoded position information which are extracted; and
    a reconstruction unit configured to reconstruct a 3D human object by using the predicted SD.

2. The 3D human object reconstruction apparatus of claim 1, wherein the ray-invariant feature is used for predicting SDs of points existing on a same ray in common.

3. The 3D human object reconstruction apparatus of claim 1, wherein the pixel-aligned feature and the ray-invariant feature are extracted on a pixel basis, and
    wherein the encoded position information is generated on a point basis.

4. The 3D human object reconstruction apparatus of claim 1, wherein the monocular image is a monocular color image,
    wherein the decoder is configured to predict the SD and color information of the point from the ray-invariant feature and the encoded position information which are extracted, and
    wherein the reconstruction unit is configured to generate a 3D color human object by applying color information to the reconstructed 3D human object.

5. The 3D human object reconstruction apparatus of claim 4, wherein the feature extraction unit, the feature encoder, the position encoder and the decoder are implemented by deep learning networks, and
    wherein a loss function for training the feature extraction unit, the feature encoder, the position encoder, and the decoder comprises a SD loss function and a SD density function.

6. The 3D human object reconstruction apparatus of claim 5, wherein the SD density function is a loss function for enhancing accuracy of color information prediction.

7. The 3D human object reconstruction apparatus of claim 1, further comprising an estimation unit configured to estimate a SD of a point,
    wherein the decoder is configured to predict the SD of the point from information which merges the extracted ray-invariant feature, encoded position information with the SD which is estimated by the estimation unit.

8. The 3D human object reconstruction apparatus of claim 7, wherein the estimation unit is configured to estimate SDs of points from the monocular image by using a skinned multi-person linear model (SMPL).

9. The 3D human object reconstruction apparatus of claim 1, further comprising an extraction unit configured to generate a mask by extracting a human object part from the monocular image, and to output masking information of a point indicated by the pointer,
    wherein the feature encoder is configured to extract the ray-invariant feature from information which merges the pixel-aligned feature and the masking information.

10. A 3D human object reconstruction method comprising:
    a step of extracting a pixel-aligned feature from a monocular image;
    a step of indicating points on a 3D space one by one in sequence;
    a step of extracting a ray-invariant feature from the pixel-aligned feature;
    a step of generating encoded position information by encoding position information of a point indicated by the pointer;
    a step of predicting a signed distance (SD) of a point from the ray-invariant feature and the encoded position information which are extracted; and
    a step of reconstructing a 3D human object by using the predicted SD.

11. A SD prediction method of a 3D human object, the SD prediction method comprising:
    a step of extracting a ray-invariant feature from a pixel-aligned feature extracted from a monocular image;
    a step of generating encoded position information by encoding position information of a point; and
    a step of predicting a signed distance (SD) of a point from the ray-invariant feature and the encoded position information which are extracted.

* * * * *